(12) United States Patent
Ichiyama et al.

(10) Patent No.: US 8,878,958 B2
(45) Date of Patent: Nov. 4, 2014

(54) IMAGE PROCESSING APPARATUS, IMAGE PICKUP APPARATUS AND IMAGE PROCESSING METHOD

(75) Inventors: Kotaro Ichiyama, Utsunomiya (JP); Satoru Komatsu, Yokohama (JP)

(73) Assignee: Canon Kabushiki Kaisha (JP)

( * ) Notice: Subject to any disclaimer, the term of this patent is extended or adjusted under 35 U.S.C. 154(b) by 104 days.

(21) Appl. No.: 13/551,733

(22) Filed: Jul. 18, 2012

(65) Prior Publication Data

US 2013/0021495 A1     Jan. 24, 2013

(30) Foreign Application Priority Data

Jul. 20, 2011     (JP) .................................. 2011-158511

(51) Int. Cl.
*H04N 9/73*     (2006.01)
*H04N 9/68*     (2006.01)
*H04N 9/04*     (2006.01)

(52) U.S. Cl.
CPC . *H04N 9/68* (2013.01); *H04N 9/045* (2013.01)
USPC .................................................... 348/225.1

(58) Field of Classification Search
USPC ........ 348/207.99, 222.1, 223.1, 224.1, 225.1, 348/241, 266, 267, 272; 392/162, 167, 254, 392/255, 264, 274; 382/162, 167, 254, 255, 382/264, 274
See application file for complete search history.

(56) References Cited

U.S. PATENT DOCUMENTS

| 7,397,499 B2 * | 7/2008 | Okada et al. ............. 348/208.13 |
| 7,551,772 B2 * | 6/2009 | Lim et al. ...................... 382/162 |
| 2011/0109749 A1 * | 5/2011 | Chanas et al. ................ 348/164 |

FOREIGN PATENT DOCUMENTS

| JP | 2008-147980 A | 6/2008 |
| JP | 2008-147981 A | 6/2008 |

* cited by examiner

*Primary Examiner* — Lin Ye
*Assistant Examiner* — Chriss Yoder, III
(74) *Attorney, Agent, or Firm* — Rossi, Kimms & McDowell LLP (57) ABSTRACT

The image processing apparatus includes a gradient calculating part calculating intensity gradient at each pixel in a captured color image, a first color blur determining part determining that a pixel at which the intensity gradient satisfies a color blur condition using a first threshold is a possible color blur pixel, and a second color blur determining part detecting a saturated pixel in the color image, and determining, when a distance between the saturated pixel and the possible color blur pixel is within a second threshold, that the possible color blur pixel is a color blur pixel. The first and second color blur determining parts change the first and second thresholds depending on at least one of luminance and chroma of the possible color blur pixel.

7 Claims, 6 Drawing Sheets

IMAGE PROCESSING APPARATUS, IMAGE PICKUP APPARATUS AND IMAGE PROCESSING METHOD

BACKGROUND OF THE INVENTION

1. Field of the Invention

The present invention relates to an image processing technique to reduce color blur in a color image produced by an image capturing system of an image pickup apparatus such as a video camera and a digital still camera.

2. Description of the Related Art

A color image produced by the above-mentioned image capturing system sometimes includes, around its high luminance portion, originally nonexistent color as color blur generated due to chromatic aberration of an imaging optical system (image taking optical system). The color blur is likely to occur at wavelengths away from a central wavelength of the imaging optical system. In a visible-light color image, a blue artifact, a red artifact or a purple artifact (purple fringe) that is a blend of the red and blue artifacts is generated as a blurred color.

A combination of plural lenses having mutually different dispersions can optically suppress the chromatic aberration of the imaging optical system to some extent. However, increase of resolution of an image sensor and reduction of size of the imaging optical system make it difficult to sufficiently suppress the chromatic aberration by optical approach. Thus, reduction of the color blur by image processing is desired.

The chromatic aberration is a phenomenon in which, for example, in an image whose green (G) plane corresponding to a central wavelength of a visible wavelength range is in focus, a red (R) plane and a blue (B) plane corresponding to edge side wavelengths thereof are out of focus. As an image processing method for correcting such chromatic aberration, Japanese Patent Laid-Open Nos. 2008-147980 and 2008-147981 disclose a method specifying a color blur correction area based on distance from a luminance saturation area or on intensity gradient (luminance gradient).

However, the method specifying the color blur correction area based only on the distance from the luminance saturation area regards whole pixels within a predetermined distance area near the saturated pixel as color blur pixels and corrects them. This method may provide an undesirable correction result in a case where the distance area is improperly set or depending on property of an object.

Moreover, the method specifying the color blur correction area based only on the intensity gradient regards whole pixels satisfying a predetermined intensity gradient condition as the color blur pixels and corrects them. This method may perform improper correction on object having the color distribution that distinction is impossible only in the intensity gradient condition and color blur not satisfying the intensity gradient condition locally due to noise.

SUMMARY OF THE INVENTION

The present invention provides an image processing apparatus, an image pickup apparatus and an image processing method capable of more properly specifying the color blur correction area in the color image including the color blur.

The present invention provides as an aspect thereof an image processing apparatus including a gradient calculating part configured to calculate intensity gradient at each pixel in a color image produced by an image capturing system, a first color blur determining part configured to determine that a pixel at which the intensity gradient satisfies a color blur condition using a first threshold is a possible color blur pixel, and a second color blur determining part configured to detect a saturated pixel in the color image, and to determine, when a distance between the saturated pixel and the possible color blur pixel is within a second threshold, that the possible color blur pixel is a color blur pixel. The first and second color blur determining parts are respectively configured to change the first and second thresholds depending on at least one of luminance and chroma of the possible color blur pixel.

The present invention provides as another aspect thereof an image processing apparatus including a color blur determining part configured to detect a saturated pixel in a color image produced by an image capturing system, and to determine that a pixel included in a near saturated pixel area where a distance from the saturated pixel is within a first threshold is a color blur pixel, and a gradient calculating part configured to calculate intensity gradient at each pixel in a near boundary area having predetermined widths both inside and outside the near saturated pixel area from a boundary pixel located outermost of the near saturated pixel area. The color blur determining part is configured to change the first threshold depending on a result of comparison of the intensity gradient with a second threshold, and to change the second threshold depending on at least one of luminance and chroma of the pixel included in the near boundary area.

The present invention provides as still another aspect thereof an image pickup apparatus including an image capturing system configured to produce a color image, and one of the above-described image processing apparatuses.

The present invention provides as yet still another aspect thereof an image processing method including a step of calculating intensity gradient at each pixel in a color image produced by an image capturing system, a step of determining that a pixel at which the intensity gradient satisfies a color blur condition using a first threshold is a possible color blur pixel, a step of detecting a saturated pixel in the color image, and a step of determining, when a distance between the saturated pixel and the possible color blur pixel is within a second threshold, that the possible color blur pixel is a color blur pixel. The method respectively changes the first and second thresholds depending on at least one of luminance and chroma of the possible color blur pixel.

The present invention provides as further still another aspect thereof an image processing method including a step of detecting a saturated pixel in a color image produced by an image capturing system, a step of determining that a pixel included in a near saturated pixel area where a distance from the saturated pixel is within a first threshold is a color blur pixel, and a step of calculating intensity gradient at each pixel in a near boundary area having predetermined widths both inside and outside the near saturated pixel area from a boundary pixel located outermost of the near saturated pixel area. The method changes the first threshold depending on a result of comparison of the intensity gradient with a second threshold, and changes the second threshold depending on at least one of luminance and chroma of the pixel included in the near boundary area.

The present invention provides as further still another aspect thereof a storage medium storing an image processing program causing a computer to execute image processing using one of the above-described image processing methods.

Further features of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

Embodiment 1

Figure 1:
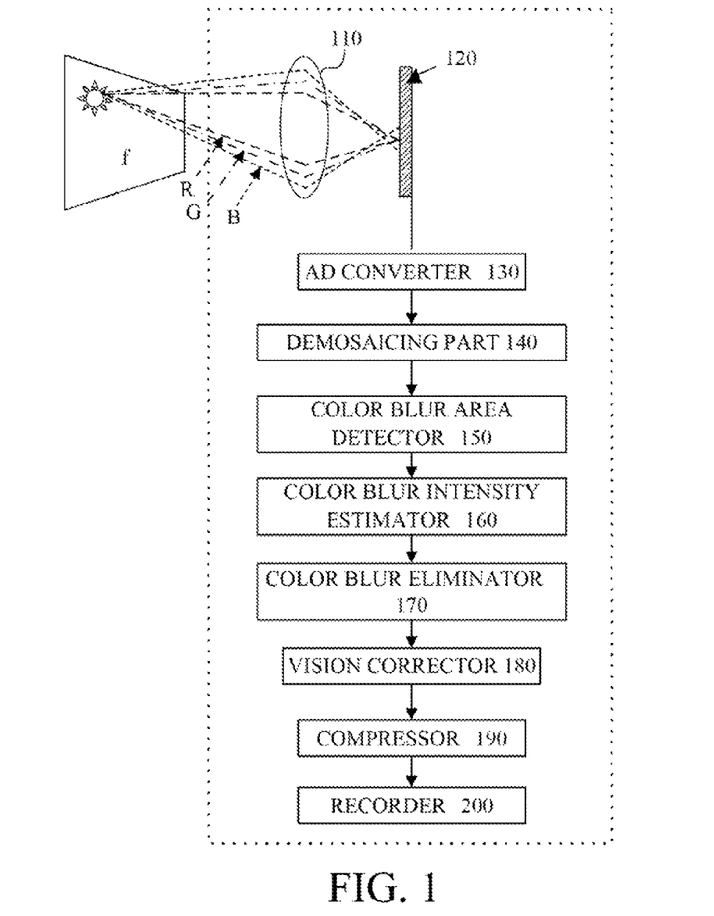
FIG. 1 is a block diagram showing a configuration of an image pickup apparatus equipped with an image processing apparatus that is Embodiment 1 of the present invention.

FIG. 1 shows a basic configuration of a color image pickup apparatus 100 equipped with an image processing apparatus that is a first embodiment (Embodiment 1) of the present invention.

The image pickup apparatus 100 includes an imaging optical system (image taking optical system) 110, an image sensor (image pickup element) 120, an AD converter 130, a demosaicing part 140, a color blur area detector 150, a color blur intensity estimator 160 and a color blur eliminator 170. The imaging optical system 110, the image sensor 120, the AD converter 130 and the demosaicing part 140 constitute an image capturing system. The color blur area detector 150, the color blur intensity estimator 160 and the color blur eliminator 170 constitute the image processing apparatus. The image pickup apparatus 100 further includes a vision corrector 180, a compressor 190 and a recorder 200. FIG. 1 shows an image pickup field (object) f and R (red), G (green) and B (blue) light rays for explanation though they are not components of the image pickup apparatus 100.

The R, G and B light rays from the image pickup field form optical images of the object on the image sensor 120 through the imaging optical system 110. In general, imaging optical systems used for color image pickup apparatuses are provided with a certain chromatic aberration correction. In contrast, in the imaging optical system 110 in this embodiment, longitudinal chromatic aberration in a wavelength region of R to G is corrected well, but on the other hand, longitudinal chromatic aberration in a wavelength region of B remains. Permission of such remaining of the longitudinal chromatic aberration in the wavelength region of B enables better correction of other aberrations, and enables miniaturization of the image pickup apparatus.

Figure 2:
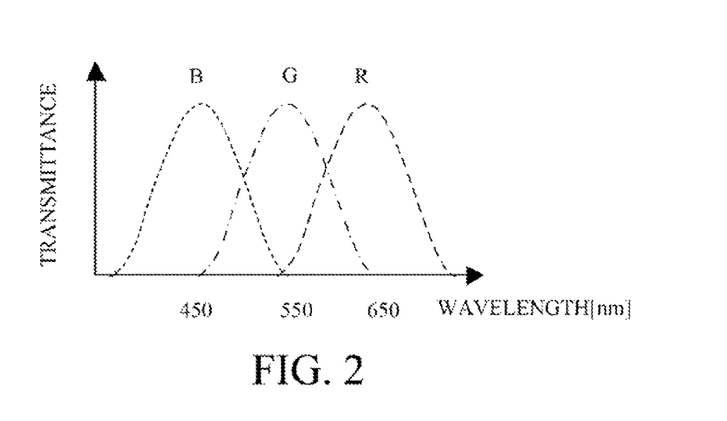
FIG. 2 is an explanatory view of a primary color filter.

The image sensor 120 is a single-panel color image sensor provided with color filters of a general primary color system. The primary color filters are constituted by three color filters respectively having main transmissive wavelength near 650 nm, 550 nm and 450 nm, as shown in FIG. 2. The image pickup apparatus captures three color planes respectively corresponding to the R, G and B wavelength regions.

Figure 3:
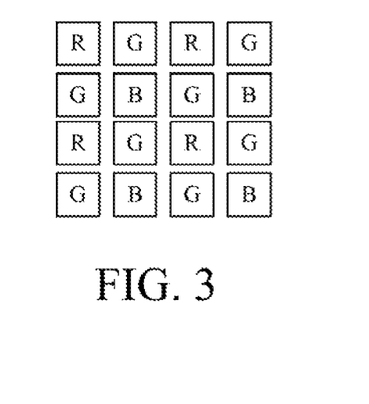
FIG. 3 is an explanatory view of a color filter array.

The single-panel color image sensor has these color filters spatially arranged for respective pixels as shown in FIG. 3, and thereby each pixel is only capable of obtaining intensity (luminance) in a single color plane. Thus, the image sensor 120 outputs a color mosaic image.

Alternatively, a three-panel color image sensor configuration may be used which divides entering light into light components of the R, G and B wavelength regions by a color separation prism (not shown) and captures the light components of the respective wavelength regions by three image sensors. In this case, the demosaicing part 140 can be omitted.

The AD convertor 130 converts the color mosaic image output as an analog signal from the image sensor 120 into digital data appropriate for subsequent image processing.

The demosaicing part 140 performs interpolation on the digital color mosaic image to produce a color image as an input image in which each pixel has RGB color information. Although many interpolation methods have conventionally been proposed such as a simple linear interpolation and a complex method, the demosaicing part 140 may use any interpolation method.

The color image produced by the demosaicing part 140 has plural color planes (R, G and B planes). The B plane has a deteriorated resolution as compared with the R and G planes due to the chromatic aberration of the imaging optical system 110. Therefore, at a boundary of a bright part and a dark part, blue is blurred and an artifact like a blue edging surrounding the bright part is generated.

Although this embodiment describes the case where the color filters provided to the image sensor 120 are the R, G and B filters of the primary color system, color filters of a complementary color system may be used. In the case of using the complementary color system color filters, a color conversion process performed on complementary colors enables acquisition of a color image constituted by the R, G and B planes.

The color blur area detector 150, the color blur intensity estimator 160 and the color blur eliminator 170 use the B plane as a target plane for color blur detection (color blur determination) and color blur elimination, and use the G plane as a reference plane.

The color blur area detector 150 performs various spatial calculations to detect a pixel(s) included in a color blur area, the pixel being referred to as "a color blur pixel". Specific processes of the color blur area detector 150 will be described later. Furthermore, the color blur area detector 150 serves as a gradient calculating part, a first color blur determining part and a second color blur determining part.

The color blur intensity estimator 160 performs spatial calculation on the color blur pixel detected by the color blur detector 150 to calculate an estimation amount of the color blur intensity. The estimation amount of the color blur intensity is hereinafter referred to as "a color blur estimation amount". The color blur intensity can be also said as "a color blur amount". The color blur eliminator 170 reduces color blur corresponding to the color blur estimation amount calculated by the color blur intensity estimator 160 from the color image as the input image by subtraction or other methods. The color blur intensity estimator 160 and the color blur eliminator 170 serve as a processing part.

The vision corrector 180 performs processes on the color image output from the color blur eliminator 170 after its color blur has been reduced for mainly improving visual image quality, such as tone curve (gamma) correction, chroma emphasis, hue correction and edge reinforcement.

The compressor 190 performs an image compression process by a compression method such as JPEG on the color image output from the vision corrector 180 to reduce its size appropriate for recording. The compressed image is recorded to a recording medium such as a flash memory by the recorder 200.

The components from the image sensor 120 to the recorder 200 may actually be constituted by respectively separate devices or by a single microprocessor. Description below will be made of a case where at least the color blur area detector 150, the color blur intensity estimator 160 and the color blur eliminator 170 are constituted by an image processing computer equipped in the image pickup apparatus 100.

Figure 4:
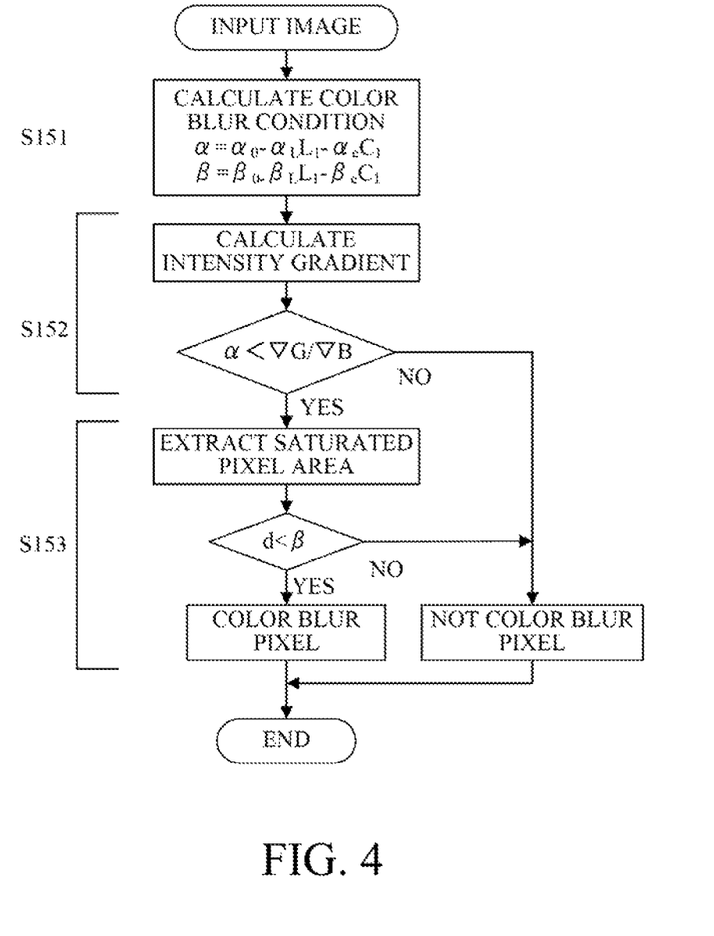
FIG. 4 is a flowchart showing processes of a color blur area detector in Embodiment 1.

Next, description of processes (image processing method) performed in the color blur area detector 150 with reference to a flowchart shown in FIG. 4. The above-mentioned image processing computer executes the processes of the color blur area detector 150 (and processes of the color blur intensity estimator 160 and the color blur eliminator 170) according to an image processing program as a computer program. This applies to other embodiments described later.

As shown in FIG. 4, the processes of the color blur area detector 150 includes a color blur condition calculating step S151, an image intensity gradient calculating step S152 and a distance calculating step S153.

Figure 5:
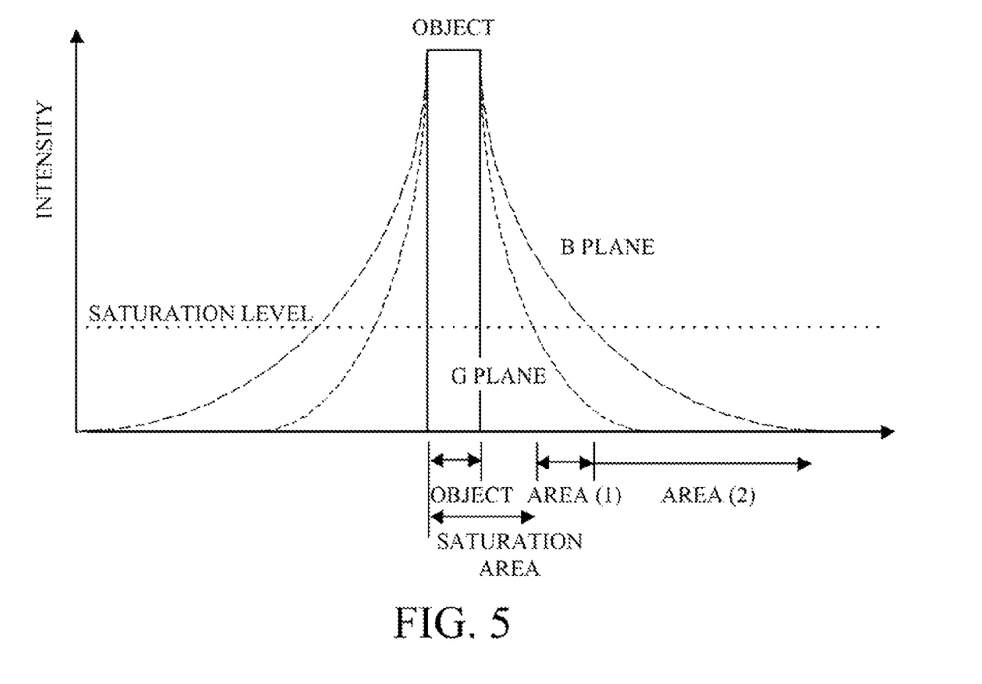
FIG. 5 is an explanatory view of values of G and B planes in a case where blue blur exists in an area in which luminance difference is large.

FIG. 5 shows typical profiles of B and G planes for a high luminance object. In FIG. 5, a horizontal axis shows a cross-section of the color image, and a vertical axis shows intensity (luminance) in the B and G planes. In FIG. 5, a high luminance object whose luminance exceeds a saturation luminance exists at a central portion, and in a periphery of the high luminance object where it is not originally bright, feet of the profiles are spread due to light exuding from the high luminance object by aberration and flare.

Intensity of the exuded light, that is, blur depends on the luminance of the high luminance object and exponentially decreases with increasing distance from the high luminance object. The G plane also includes blur, that is, a certain degree of spread of the profile, but the blur is smaller than that in the B plane. The image sensor cannot measure intensity higher than its saturation level, so that output from the image sensor for the intensity higher than the saturation level is flattened. Therefore, in the color image, G and B are saturated in an area larger than the original high luminance object, and thereby a white saturation area ("SATURATION AREA" in FIG. 5) is formed.

Although the intensity of G decreases with increasing distance from the saturation area, intensity difference between G and B gradually increases since a radius of the saturation area (hereinafter referred to as "a saturation radius") of B is larger than a saturation radius of G, which increases blue of light blue in an area (1) shown in FIG. 5. However, the intensity of B also decreases with increasing the distance from the saturation area of B, the intensity difference between G and B gradually decreases in an area (2) shown in FIG. 5. In a more distant area from an end of a foot of G, only the B plane has intensity, which generates deep blue blur.

This embodiment detects, in consideration of such profiles, the blue blur by focusing on the color blur pixel has features that it is located near the saturated pixel, it has a relatively high luminance and a relatively high chroma, and it has a ratio of intensity gradient (luminance gradient) $\nabla B$ in the B plane and intensity gradient (luminance gradient) $\nabla G$ in the G plane.

Specifically, the color blur area detector 150 sets, at the color blur condition calculating step S151, based on the above features of the color blur pixel, a color blur condition relating to intensity gradient (hereinafter referred to as "a color blur intensity gradient condition") and a color blur condition relating to distance from the saturation area (hereinafter referred to as "a color blur distance condition"), and then detects the color blur pixel by using these color blur conditions. The color blur area detector 150 first calculates thresholds for these conditions at the color blur condition calculating step S151.

The color blur area detector 150 detects (or determines), when the ratio (relationship) of the intensity gradient $\nabla B$ and the intensity gradient $\nabla G$ is equal to or larger than a first threshold $\alpha$, which is the color blur intensity gradient condition, a target pixel providing such intensity gradient $\nabla B$ and intensity gradient $\nabla G$ as a possible color blur pixel. For example, the color blur area detector 150 calculates the first threshold $\alpha$ by the following expression:

$$\alpha = \alpha_0 - \alpha_L L_1 - \alpha_C C_1$$

where $L_1$ represents luminance of the target pixel, $C_1$ represents chroma of the target pixel, $\alpha_0$ represents a threshold for a base luminance, and $\alpha_L$ and $\alpha_C$ represent coefficients.

As compared with a conventional method using a constant threshold, such changing of the threshold $\alpha$ so as to become smaller as the luminance and the chroma increase makes it easier to detect a pixel having higher luminance and higher chroma as the possible color blur pixel. Thereby, it is possible to avoid the possible color blur pixel from being excluded from the color blur condition due to noise, and also to suppress pixels having gradational values and being distant from the saturated pixel from being detected as the possible color blur pixel.

Moreover, the color blur area detector 150 specifies a distance range, where a saturated pixel near a target pixel among the possible color blur pixels is searched for, from the target pixel as the color blur distance condition. Specifically, the color blur area detector 150 detects (determines), when the saturated pixel exists within a distance equal to or shorter than a second threshold $\beta$ from the target pixel (that is, when a distance from the saturated pixel to the target pixel is equal to or shorter than the second threshold $\beta$), the target pixel as the color blur pixel. For example, the color blur area detector 150 calculates the second threshold $\beta$ by the following expression:

$$\beta = \beta_0 - \beta_L L_1 - \beta_C C_1$$

where $\beta_0$ represents a threshold for the base luminance, and $\beta_L$ and $\beta_C$ represent coefficients.

As compared with the conventional method using the constant threshold, such changing of the threshold $\beta$ so as to become smaller as the luminance and the chroma increase provides a condition that the color blur pixel having higher luminance and higher chroma exists nearer the saturated pixel. This condition suppresses detection of a pixel showing an object color with high luminance and high chroma at a position distant from the saturated pixel, and also further reduces a calculation amount for a pixel having higher luminance and higher chroma. Furthermore, the condition suppresses the color blur pixel existing an edge of the color blur profile and having low luminance and low chroma from being excluded from color blur detection, which enables highly accurate color blur detection.

The above-described calculation methods of the thresholds $\alpha$ and $\beta$ are merely examples, and other calculation methods may be employed. Specifically, the thresholds $\alpha$ and $\beta$ may be calculated by using at least one of luminance and chroma; for example, by using only the luminance $L_1$ as follows:

$$\alpha = \alpha_0 - \alpha_1 L_1$$

$$\beta = \beta_0 - \beta_1 L_1$$

At the image intensity gradient calculating step S152, the color blur area detector 150 calculates an intensity gradient map in the B plane and an intensity gradient map in the G plane. The color blur area detector 150 calculates the intensity gradient ∇B and the intensity gradient ∇G as follows:

$$\nabla B = \left(\frac{dB}{dx}, \frac{dB}{dy}\right) \equiv \left(\frac{B(x+1, y) - B(x-1, y)}{2}, \frac{B(x, y+1) - B(x, y-1)}{2}\right)$$

$$\nabla G = \left(\frac{dG}{dx}, \frac{dG}{dy}\right) \equiv \left(\frac{G(x+1, y) - G(x-1, y)}{2}, \frac{G(x, y+1) - G(x, y-1)}{2}\right)$$

where G(x+1,y) and B(x+1,y) respectively represent pixel values of a right adjacent pixel to the target pixel (G(x,y) and B(x,y)) in the G and B planes, G(x−1,y) and B(x−1,y) respectively represent pixel values of a left adjacent pixel to the target pixel in the G and B planes, G(x,y+1) and B(x,y+1) respectively represent pixel values of a lower adjacent pixel to the target pixel in the G and B planes, and G(x,y−1) and B(x,y−1) respectively represent pixel values of an upper adjacent pixel to the target pixel in the G and B planes.

The above-described calculation method of the intensity gradient ∇B and the intensity gradient ∇G is merely an example, and other calculation methods may be employed. For example, the calculation thereof may be performed in a larger pixel area than that described above.

Then, at the image intensity gradient calculating step S152, the color blur area detector 150 determines whether or not the intensity gradient at the target pixel (hereinafter also referred to "the intensity gradient of the target pixel") satisfies the color blur intensity gradient condition by using the intensity gradient maps in the B and G planes. In this embodiment, the color blur area detector 150 sets the color blur intensity gradient condition as follows:

$$\nabla < \nabla G / \nabla B$$

where the symbol "<" includes not only a case where ∇G/∇B is larger than a but also a case where ∇G/∇B is equal to α. This condition compares the ratio of the intensity gradient in the reference plane (G plane) and the intensity gradient in the target plane (B plane) with the first threshold α.

The color blur area detector 150 performs this determination over the entire input image by setting each of all pixels as the target pixel to extract the possible color blur pixels each satisfying the color blur intensity gradient condition. That is, the color blur area detector 150 determines that the target pixel at which the intensity gradient satisfies the color blur condition using the first threshold α is the possible color blur pixel.

Figure 6:
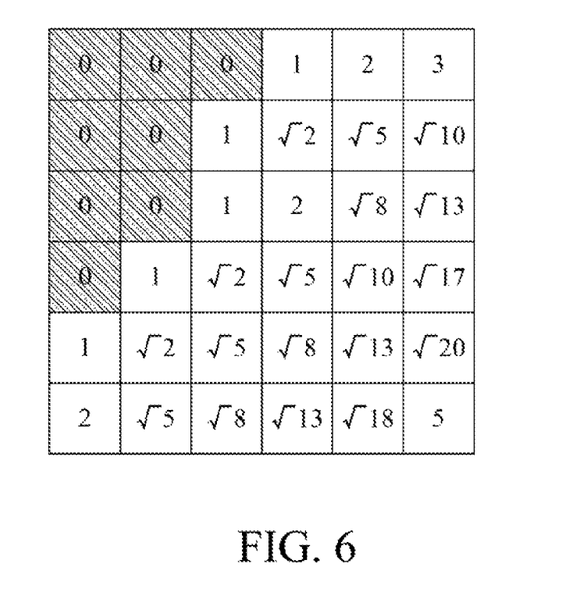
FIG. 6 is an explanatory view of distance from a luminance saturation area.

At the distance calculating step S153, the color blur area detector 150 extracts (detects) a saturated pixel area where the intensity is equal to or higher than a certain threshold in the G plane that is the reference plane. Then, the color blur area detector 150 calculates a distance d to each of the possible color blur pixels extracted at the image intensity gradient calculating step S152 from the saturated pixel included in the saturated pixel area and located nearest that possible color blur pixel by pixel pitch. The saturated pixel nearest the possible color blur pixel is hereinafter referred to as "a nearest saturated pixel". For example, in FIG. 6 showing the saturated pixel area as a hatched pixel area and showing the possible color blur pixels as non-hatched pixels, the distance d is shown as a value in a frame of each possible color blur pixel.

In addition, at the distance calculating step S153, the color blur area detector 150 sets the color blur condition relating to the distance using the second threshold β calculated at the color blur condition calculating step S151 as follows:

$$d < \beta$$

where the symbol "<" includes not only a case where d is smaller than β but also a case where d is equal to β.

Then, the color blur area detector 150 determines that the possible color blur pixel(s) whose calculated distance d satisfies this color blur condition is a color blur pixel(s), that is, a true color blur pixel.

This embodiment defines the saturated pixel as a pixel whose intensity on any one of the G and B planes is equal to or higher than a certain value. The distance between the pixels may be expressed not only by Euclidean distance that is an accurate distance, but also by quansi-Euclidean distance, chessboard distance or city block distance.

As a method for searching for the saturated pixel, detection of presence or absence of the saturated pixel may be made in pixels whose distances are within the second threshold β calculated at the color blur condition calculating step S151. Then, determination may be made that the target pixel is the color blur pixel. This case also corresponds to a case where the color blur area detector 150 is "configured to detect a saturated pixel in the color image, and to determine, when a distance between the saturated pixel and the possible color blur pixel is within a second threshold, that the possible color blur pixel is a color blur pixel".

Figure 7:
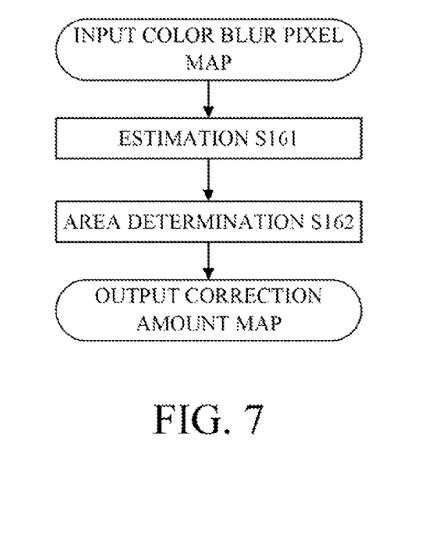
FIG. 7 is a block diagram showing a configuration of a color blur intensity estimator in Embodiment 1.

The color blur intensity estimator 160 estimates color blur intensity of the color blur pixel(s) extracted by the color blur area detector 150. FIG. 7 shows a flowchart of processes performed by the color blur intensity estimator 160, the processes including an estimating step S161 and an area determining step S162.

At the estimating step S161, the color blur intensity estimator 160 calculates the estimation amount of the color blur intensity (that is, the above-mentioned color blur estimation amount) in the B plane for each pixel of the color image. For both cases where the B plane is saturated and not saturated, the color blur intensity estimator 160 calculates two color blur estimation amounts $E_1$ and $E_2$. The color blur intensity estimator 160 calculates the estimation amount $E_1$ by using the distance d from the saturated pixel, the distance d having been calculated at the distance calculating step S153. For example, the calculation of the estimation amount $E_1$ is made as follows:

$$E_1 = R_b D_{GB}^2 k_1 |\nabla B|/d$$

where $R_b$ represents the following intensity gradient ratio of at a boundary of the areas (1) and (2) shown in FIG. 5:

$$|\nabla G|/|\nabla B|,$$

$D_{GB}$ represents an absolute value of difference between the saturation radius in the G plane and the saturation radius in the B plane, and $k_1$ represents a coefficient having a positive value.

In a saturation area where the intensity of B is saturated, the intensity gradient becomes 0, which makes it impossible to obtain the intensity gradient before the saturation. Thus, the color blur intensity estimator 160 calculates the estimation amount $E_2$ for such a saturation area of B by using the intensity gradient ∇G in the G plane. For example, the calculation of the estimation amount $E_2$ is made as follows:

$E_2 = k_1 d/|\nabla G|$

At the area determining step S162, the color blur intensity estimator 160 performs nonlinear conversion of the intensity in the B plain to produce a saturation degree S. This saturation degree S shows whether or not the intensity of B is saturated; the saturation degree S becomes 1 in a case where the intensity of B is saturated and becomes 0 in a case where the intensity of B is not saturated. The color blur intensity estimator 160 selects $E_1$ or $E_2$ calculated at step S161, depending on the saturation degree S. That is, the color blur intensity estimator 160 newly sets the estimation amount E as follows:

$$E = \begin{cases} E_1 ... (S = 0) \\ E_2 ... (S = 1) \end{cases}$$

The estimation amount may be calculated without using the result of the distance calculating step S153 as follows:

$E_1 = k_1 |\nabla B|$ $E_2 = k_2 |\nabla G|$ where $k_2$ is a coefficient having a positive value.

The estimation amount E thus calculated is sent to the color blur eliminator 170. The color blur eliminator 170 performs the color blur reduction process using the estimation amount E as described above to produce an output image in which the color blur is well corrected.

As described above, this embodiment effectively separates the blue blur from the blue gradation of the object by changing the color blur condition depending on the features such as the luminance and chroma of the object and those of the blue blur, which enables acquisition of an output image (captured image) in which the blue blur is reduced without unnaturalness. Moreover, this embodiment can loosen the limitation of the longitudinal chromatic aberration of the B band in the imaging optical system, which makes it possible to achieve higher levels of correction of other aberrations, miniaturization and cost reduction of the imaging optical system.

Embodiment 2

Next, description will be made of an image processing apparatus that is a second embodiment (Embodiment 2) of the present invention. Embodiment 2 is different from Embodiment 1 in the processes performed by the color blur area detector 150 and the color blur intensity estimator 160, but is identical to Embodiment 1 in the configuration of the apparatus and the other processes, so that description will be mainly made of the different processes from Embodiment 1.

In this embodiment, the imaging optical system 110 shown in FIG. 1 causes the R, G and B light rays to form images on the image sensor 120 in a state where the longitudinal chromatic aberrations of the wavelength regions of G and B are corrected well, but the longitudinal chromatic aberration of the wavelength region of R remains.

Figure 8:
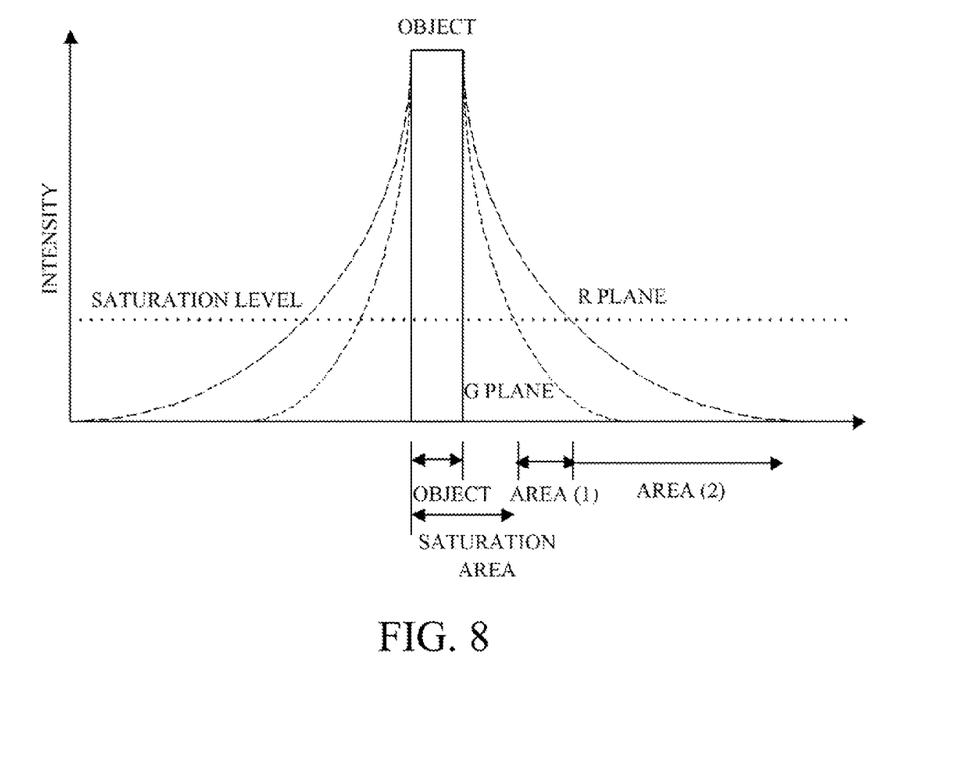
FIG. 8 is an explanatory view of values of R and G planes in a case where red blur exists in an area in which luminance difference is large.

FIG. 8 shows a typical intensity profile of red blur (profiles of R and G planes) in a color image. In FIG. 8, a horizontal axis shows a cross-section of the color image, and a vertical axis shows intensity (luminance) in the R plane that is a target plane for color blur detection (color blur determination) and the G plane that is a reference plane. In FIG. 8, a high luminance object whose luminance exceeds a saturation luminance exists at a central portion, and in a periphery of the high luminance object where it is not originally bright, feet of the profiles are spread due to light exuding from the high luminance object by aberration and flare.

Intensity of this exuded light, that is, blur depends on the luminance of the high luminance object and exponentially decreases with increasing distance from the high luminance object. The G plane also includes blur, that is, a certain degree of spread, but the blur is smaller than that in the R plane. The image sensor cannot measure intensity higher than its saturation level, so that output from the image sensor for the intensity higher than the saturation level is flattened. Therefore, in the color image, G and R are saturated in an area larger than the original high luminance object, and thereby a white saturation area ("SATURATION AREA" in FIG. 8) is formed.

Although the intensity of G decreases with increasing distance from the saturation area, intensity difference between G and R gradually increases since a saturation radius of R is larger than that of G, which increases red in an area (1) shown in FIG. 8. However, the intensity of R also decreases with increasing the distance from the saturation area of R, the intensity difference between G and R gradually decreases in an area (2) shown in FIG. 8. In a more distant area from an end of a foot of G, only the R plane has intensity, which generates red blur.

This embodiment detects, in consideration of such profiles, the red blur by focusing on the color blur pixel has features that it is located near a saturated pixel, it has a relatively high luminance and a relatively high chroma, and it has a ratio of intensity gradient (luminance gradient) $\nabla R$ in the R plane and intensity gradient (luminance gradient) $\nabla G$ in the G plane.

Figure 9:
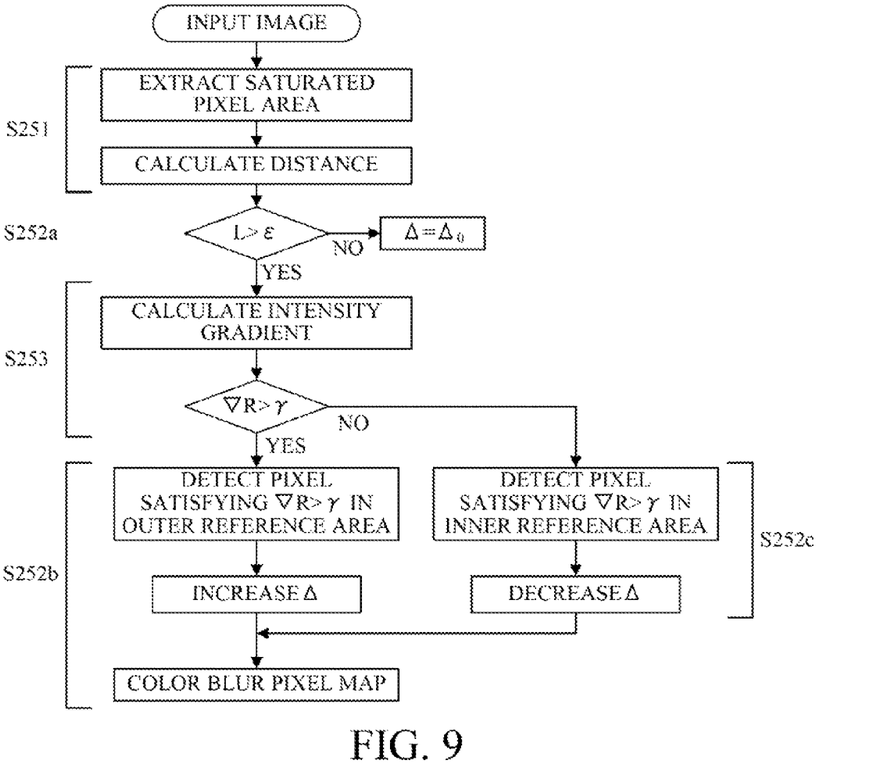
FIG. 9 is a flowchart showing processes of a color blur area detector in Embodiment 2 of the present invention.

FIG. 9 shows the processes performed in the color blur area detector 150 in this embodiment. The processes of the color blur area detector 150 include a distance calculating step S251, a color blur condition calculating step S252 and an image intensity gradient calculating step S253. The color blur area detector 150 sets, at the color blur condition calculating step S252, a color blur condition relating to distance from the saturation area (color blur distance condition) and a color blur condition relating to intensity gradient (color blur intensity gradient condition).

As an example of the color blur distance condition, the color blur area detector 150 determines that a target pixel included in a near saturated pixel area where a distance d from a detected saturated pixel (nearest saturated pixel) is equal to or shorter than a first threshold Δ is a color blur pixel. The near saturated pixel area corresponds to a color blur area including the color blur pixel(s) if the first threshold Δ is properly set, and becomes a target for a color blur reduction process (correction process).

Although the distance d from the saturated pixel differs in the respective color planes, calculation of the color blur condition may be made in any color plane. The color blur area detector 150 sets an initial threshold $\Delta_0$ as an initial value of the first threshold Δ, and calculates an amount to be changed from the initial threshold $\Delta_0$ according to conditions using (relating to) luminance and intensity gradient to decide the first threshold Δ based on the calculated change amount. Although this embodiment uses a constant as the initial threshold $\Delta_0$, the initial threshold $\Delta_0$ may be changed according to the saturation radius. In this embodiment, a threshold of the condition relating to luminance is represented by ε.

On the other hand, the color blur intensity gradient condition is a condition to properly set the near saturated pixel area (that is, the first threshold Δ) depending on a result of determination of a magnitude relationship between the intensity gradient and a second threshold γ. In this embodiment, the color blur area detector 150 calculates the second threshold γ by using luminance and chroma of the target pixel as follows:

$\gamma = \gamma_0 - \gamma_L L_1 - \gamma_C C_1$ where $L_1$ represents the luminance of the target pixel, $C_1$ represents the chroma of the target pixel, and $\gamma_0$, $\gamma_L$ and $\gamma_C$ represent coefficients.

The above-described calculation method of the second threshold γ is merely an example, and other calculation methods may be employed. Specifically, the second threshold γ may be calculated by using at least one of the luminance $L_1$ and the chroma $C_1$; for example, by using only the luminance $L_1$ as follows:

$\gamma = \gamma_0 - \gamma_L L_1$

This embodiment changes the first threshold Δ depending on the luminance and the intensity gradient to properly set the first threshold Δ.

First, at She distance calculating step S251, the color blur area detector 150 extracts (detects) the saturated pixel area where the intensity is equal to or higher than a certain threshold in both the G and R planes. Then, the color blur area detector 150 calculates distances $d_G$ and $d_R$ to the target pixel (or each of the target pixels) included in the near saturated pixel area from the saturated pixel included in the saturated pixel area and located nearest that target pixel by pixel pitch. The saturated pixel nearest the target pixel is hereinafter referred to as "a nearest saturated pixel". Next, the color blur area detector 150 detects the target pixel(s) whose distances $d_G$ and $d_R$ are closest to the initial threshold $\Delta_0$ to set this target pixel(s) as a reference pixel(s). The reference pixel corresponds to a boundary pixel located on an outermost boundary of the near saturated pixel area.

Next, at a luminance condition calculating step S252a of the color blur condition calculating step S252, the color blur area detector 150 determines whether or not the luminance L of the reference pixel(s) extracted at the distance calculating step S251 satisfies the following condition:

$L > \epsilon$

That is, the color blur area detector 150 determines whether or not the reference pixel(s) has luminance appropriate for the color blur pixel.

If the reference pixel(s) does not satisfy this condition, the color blur area detector 150 sets the first threshold Δ to $\Delta_0$ so as not to change the near saturated pixel (that is, so as not to change the first threshold Δ). If the reference pixel(s) satisfies the condition, the color blur area detector 150 sends the reference pixel(s) to the image intensity gradient calculating step S253.

At the image intensity gradient calculating step S253, the color blur area detector 150 calculates the intensity gradient of the reference pixel(s) satisfying the condition at the luminance condition calculating step S252a. It is desirable that the intensity gradient be calculated in a color plane identical to the color plane in which the first threshold Δ has been calculated.

In this embodiment, the color blur area detector 150 calculates the intensity gradient ∇R in the R plane, and sets the color blur intensity gradient condition as follows:

$\nabla R > \gamma$

The color blur area detector 150 proceeds to a condition calculating step S252b if this condition is satisfied, and proceeds to a condition calculating step S252c if the condition is satisfied.

Figure 10:
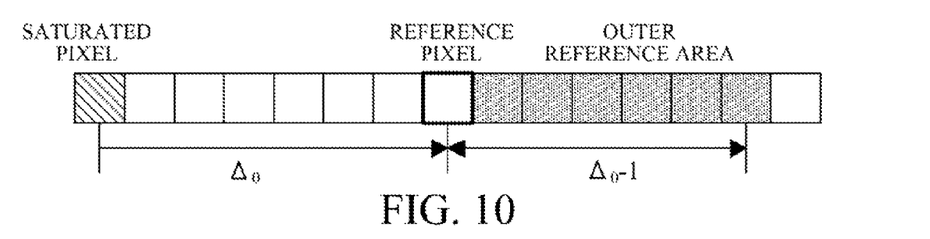
FIG. 10 shows a reference area when an image intensity gradient is large.

At the condition calculating step S252b, the color blur area detector 150 sets, as shown as a hatched area in FIG. 10, an area up to a distance ($\Delta_0 - 1$) from the reference pixel in a direction away from the saturated pixel (that is, toward an outside of the near saturated pixel area) as an outer reference area. Then, the color blur area detector 150 calculates the intensity gradient of each pixel in the outer reference area, and detects a pixel(s) at which the intensity gradient ∇R satisfies the above-described color blur intensity gradient condition of $\nabla R > \gamma$.

In a case where continuous pixels from the reference pixel to an intermediate one of plural pixels in the outer reference area satisfy the above-described color blur condition, the color blur area detector 150 changes (increases), using a distance $d_{max}$ to a pixel not satisfying the color blur condition and being located next to the intermediate pixel from the nearest saturated pixel, the first threshold Δ from $\Delta_0$ to $d_{max} - 1$.

Figure 11:
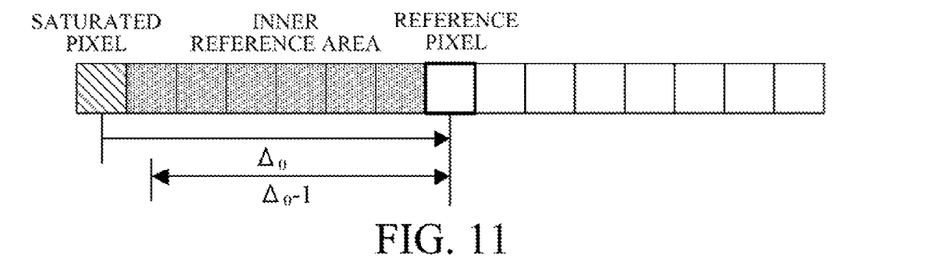
FIG. 11 shows the reference area when the image intensity gradient is small.

On the other hand, at the condition calculating step S252c, the color blur area detector 150 sets, as shown as a hatched area in FIG. 11, an area up to a distance ($\Delta_0 - 1$) from the reference pixel in a direction closer to the saturated pixel (that is, toward an inside of the near saturated pixel area) as an inner reference area. Then, the color blur area detector 150 calculates the intensity gradient of each pixel in the inner reference area, and detects a pixel(s) at which the intensity gradient ∇R satisfies the above-described color blur intensity gradient condition of $\nabla R > \gamma$. In a case where an intermediate one of plural pixels in the inner reference area first satisfies the above-described color blur condition, the color blur area detector 150 changes (decreases), using a distance $d_{min}$ to the pixel satisfying the color blur condition from the nearest saturated pixel, the first threshold Δ from $\Delta_0$ to $d_{min}$. As described above, the color blur area detector 150 determines, at the condition calculating steps S252b and S252c, the pixels(s) existing in the near saturated pixel area that is the area up to the distance threshold (first threshold) Δ from the saturated pixel as the color blur pixel(s), and sends the color blur map showing the color blur pixel(s) to the color blur intensity estimator 160. Although this embodiment has described the case of using the same predetermined width ($\Delta_0 - 1$) for deciding the outer and inner reference areas, mutually different predetermined widths may be used for deciding them.

Figure 12:
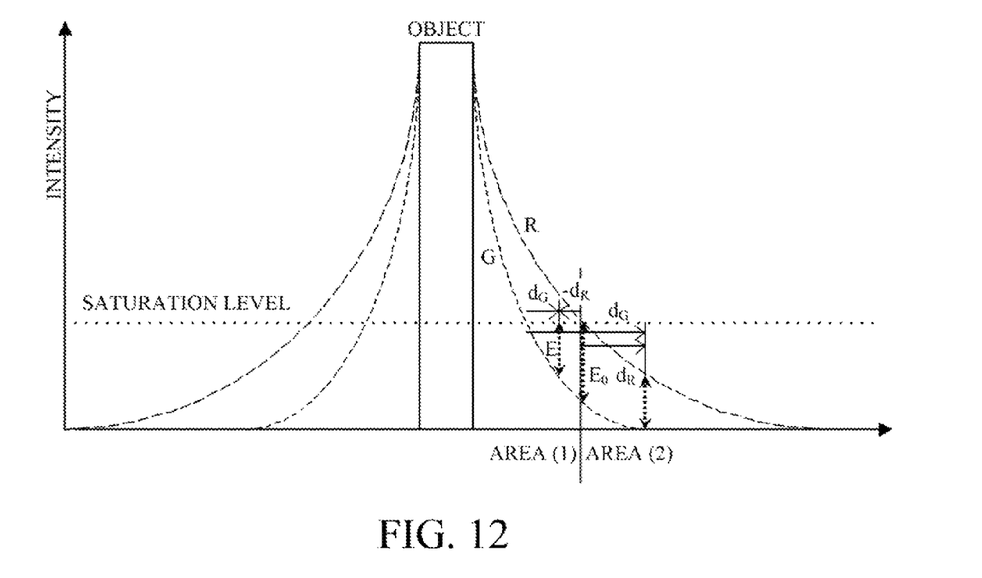
FIG. 12 shows red blur and definition of distances to a luminance saturated pixel in RGB planes.

The color blur intensity estimator 160 also calculates, similarly to Embodiment 1, the two color blur estimation amounts $E_1$ and $E_2$ for the cases where R is saturated or not saturated. However, the calculation of the color blur estimation amounts is made by a method different from that in Embodiment 1; for example, the calculation is made as follows:

$$E_1 = \{k_1(d_G - d_R) + k_0\} \frac{d_G}{d_G - d_R}$$

$$E_2 = \{k_1(d_G - d_R) + k_0\} \exp(-k_2 d_R)$$

where $k_0$, $k_1$ and $k_2$ represent constants. The constants differ depending on characteristics of the imaging optical system and pixel pitch of the image sensor, and therefore are desirable to be set to values appropriate for approximating the color blur amount from the input image. FIG. 12 shows a relationship between the typical profiles of the R and G planes for the high luminance object shown in FIG. 8 and the distances $d_G$ and $d_R$ from the saturated pixels in the R and G planes. In FIG. 12, a horizontal axis shows the cross-section of the color image, and a vertical axis shows the intensity in the R and G planes. The color blur estimation amounts $E_1$ and $E_2$ are identical to $E_0 = (k_1 d_G + k_0)$ on a boundary line of the areas (1) and (2) shown in FIGS. 8 and 12, which does not generate Mach bands.

Then, the color blur intensity estimator 160 calculates the color blur estimation amount E from $E_1$ and $E_2$ as well as at the area determining step S162 described in Embodiment 1, and sends the color blur estimation amount E to the color blur eliminator S170.

The color blur eliminator 170 performs the color blur reduction process using the color blur estimation amount E as described above to produce the output image in which the color blur is corrected well.

This embodiment can accurately specify the near saturated pixel area (that is, the color blur area) where the color blur reduction process is performed, by changing the first threshold Δ depending on the feature of the saturated pixel, which enables production of the output image in which the color blur is corrected well.

Embodiment 3

Next, description will be made of an image processing apparatus that is a third embodiment (Embodiment 3) of the present invention. Embodiment 3 is different from Embodiment 1 in the processes performed by the color blur area detector 150, but is identical to Embodiment 1 in the configuration of the apparatus and the other processes, so that description will be mainly made of the different processes from Embodiment 1.

This embodiment treats plural pixels around the saturated pixel as a cluster, and performs color blur determination on the cluster. In other words, this embodiment extracts a possible color blur cluster instead of the possible color blur pixel described in Embodiment 1.

Figure 13:
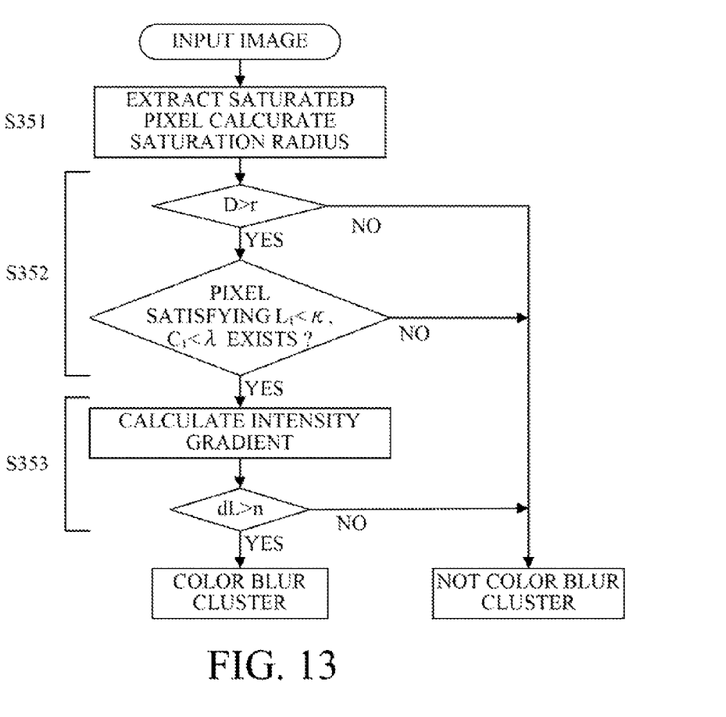
FIG. 13 is a flowchart showing processes of a color blur area detector in Embodiment 3 of the present invention.

FIG. 13 shows the processes performed in the color blur area detector 150 in this embodiment. The processes of the color blur area detector 150 includes a distance calculating step S351, a color blur condition calculating step S352 and an image intensity gradient calculating step S353. The color blur area detector 150 serves as a cluster determining part.

At the distance calculating step S351, the color blur area detector 150 extracts the saturated pixel(s) whose intensity is equal to or higher than a certain threshold in both the G and R planes, and calculates the saturation radius for each saturated pixel in an arbitrary color plane. For example, this embodiment calculates the saturation radius $d_B$ in the B plain. The saturation radius differs in directions from the saturated pixel, so that this embodiment uses a maximum saturation radius $d_{Bmax}$ as the saturation radius $d_B$. However, the saturation radius $d_B$ is not limited thereto; for example, an average value of the saturation radii in plural directions may be used as the saturation radius $d_B$.

At the color blur condition calculating step S352, the color blur area detector 150 sets in advance a color blur condition relating to intensity gradient (color blur intensity gradient condition) and a color blur condition relating to distance from the saturated pixel (color blur distance condition). Specifically, the color blur area detector 150 calculates thresholds for the respective color blur conditions by using the saturation radius $d_B$ calculated at the distance calculating step S351, luminance and chroma. The threshold D used in the color blur distance condition is a threshold to specify a distance range from the saturated pixel. The color blur area detector 150 decides an area as the color blur cluster (possible color blur cluster) for each saturated pixel by using the threshold D. For example, the color blur area detector 150 calculates the threshold D as follows:

$$D=\phi_0 d_B+\phi_1$$

where $\phi_0$ and $\phi_1$ represent coefficients. The color blur area detector 150 decides pixel(s) whose distance r from the saturated pixel satisfies the following condition using the threshold D for the distance calculated from each saturated pixel, as the possible color blur cluster of that saturated pixel.

$$D>r$$

Next, the color blur area detector 150 determines whether or not a pixel(s) satisfying the following conditions using a threshold κ for luminance and a threshold λ for chroma exists in the possible color blur cluster:

$$L_1<\kappa$$

$$C_1<\lambda$$

The thresholds κ and λ are desirable to be set from a typical color blur profile of an image capturing system to be used. Referring an outer peripheral edge of the color blur cluster (that is, a boundary portion of the color blur cluster with an outside thereof) can reduce calculation amount. If the pixel(s) satisfying the above conditions does not exist in the possible color blur cluster, the color blur area detector 150 determines that that possible color blur cluster is not a color blur cluster.

On the other hand, if the pixel(s) satisfying the above conditions exists in the possible color blur cluster, the color blur area detector 150 calculates a third threshold η to be used for the color blur intensity gradient condition, for each of target pixels in that possible color blur cluster, from luminance and chroma of the target pixel. For example, the color blur area detector 150 calculates the third threshold η as follows:

$$\eta=\eta_0-\eta_L L_1-\eta_C C_1$$

where $L_1$ represents the luminance of the target pixel, $C_1$ represents the chroma of the target pixel, and $\eta_0$, $\eta_L$ and $\eta_C$ represent coefficients.

The above-described calculation method of the third threshold η is merely an example, and other calculation methods may be employed. Specifically, the third threshold η may be calculated by using at least one of the luminance $L_1$ and the chroma $C_1$; for example, by using only the luminance $L_1$ as follows:

$$\eta=\eta_0-\eta_L L_1$$

Moreover, at least one of the above-described two conditions of $L_1<\kappa$ and $C_1<\lambda$ may be used.

At the image intensity gradient calculating step S353, the color blur area detector 150 calculates the intensity gradient in each of the G and B plans in the possible color blur cluster calculated at the color blur condition calculating step 352. Then, the color blur area detector 150 determines, when the calculated intensity gradient dL satisfies the following color blur intensity gradient condition, that the possible color blur cluster is a final (true) color blur cluster.

$$dL>\eta$$

The color blur cluster thus extracted is sent to the color blur intensity estimator 160 where a same process as that described in Embodiment 1 is performed.

This embodiment can exclude the object color including the saturated pixel from the target area for the color blur reduction process. Moreover, this embodiment searches around the saturated pixel, which enables reduction of erroneous processes and enables production of the output image in which the color blur is reduced well even when plural saturated pixels exist at mutually near positions.

Although each of the above embodiments has described the image pickup apparatus using the image processing method (or equipped with the image processing apparatus), the image processing method may be embodied by an image processing program to be installed in a personal computer. In this case, the personal computer corresponds to the image processing apparatus. The personal computer acquires an input image produced by an image pickup apparatus before the color blur reduction process, and then performs the color blur reduction process on the input image by using the image processing program to output a resultant image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-158511, filed on Jul. 20, 2011, which is hereby incorporated by reference herein in its entirety.

What is claimed is:

1. An image processing apparatus comprising:
   a gradient calculating part configured to calculate intensity gradient at each pixel in a color image produced by an image capturing system;
   a first color blur determining part configured to determine that a pixel at which the intensity gradient satisfies a color blur condition using a first threshold is a possible color blur pixel; and
   a second color blur determining part configured to detect a saturated pixel in the color image, and to determine, when a distance between the saturated pixel and the possible color blur pixel is within a second threshold, that the possible color blur pixel is a color blur pixel,
   wherein the first and second color blur determining parts are respectively configured to change the first and second thresholds depending on at least one of luminance and chroma of the possible color blur pixel.

2. An image processing apparatus according to claim 1, wherein the color blur condition using the first threshold is a condition that compares a ratio of the intensity gradient in a reference plane and the intensity gradient in a color blur determination target plane with the first threshold.

3. An image processing apparatus according to claim 1, further comprising:
   a cluster determining part configured to determine that an area in which the calculated intensity gradient satisfies a color blur condition using a third threshold is a possible color blur cluster, which is a target area for determining the possible color blur pixel,
   wherein the cluster determining part is configured to change the third threshold depending on at least one of luminance and chroma of pixels in the possible color blur cluster.

4. An image processing apparatus according to claim 1, further comprising:
   a processing part configured to calculate an estimation amount of a color blur intensity at the color blur pixel, and to perform a color blur reduction process on the color blur pixel using the estimation amount.

5. An image pickup apparatus comprising:
   an image capturing system configured to produce a color image; and
   an image processing apparatus comprising:
   a gradient calculating part configured to calculate intensity gradient at each pixel in a color image produced by an image capturing system;
   a first color blur determining part configured to determine that a pixel at which the intensity gradient satisfies a color blur condition using a first threshold is a possible color blur pixel; and
   a second color blur determining part configured to detect a saturated pixel in the color image, and to determine, when a distance between the saturated pixel and the possible color blur pixel is within a second threshold, that the possible color blur pixel is a color blur pixel,
   wherein the first and second color blur determining parts are respectively configured to change the first and second thresholds depending on at least one of luminance and chroma of the possible color blur pixel.

6. An image processing method that utilizes a processor, the method comprising the steps of:
   calculating intensity gradient at each pixel in a color image produced by an image capturing system;
   determining that a pixel at which the intensity gradient satisfies a color blur condition using a first threshold is a possible color blur pixel;
   detecting a saturated pixel in the color image; and
   determining, using the processor, when a distance between the saturated pixel and the possible color blur pixel is within a second threshold, that the possible color blur pixel is a color blur pixel,
   wherein the method respectively changes the first and second thresholds depending on at least one of luminance and chroma of the possible color blur pixel.

7. A non-transitory computer readable storage medium storing an image processing program causing a computer to execute image processing, the image processing comprising the steps of:
   calculating intensity gradient at each pixel in a color image produced by an image capturing system;
   determining that a pixel at which the intensity gradient satisfies a color blur condition using a first threshold is a possible color blur pixel;
   detecting a saturated pixel in the color image; and
   determining, when a distance between the saturated pixel and the possible color blur pixel is within a second threshold, that the possible color blur pixel is a color blur pixel,
   wherein the image processing respectively changes the first and second thresholds depending on at least one of luminance and chroma of the possible color blur pixel.

* * * * *